United States Patent
Hong

(10) Patent No.: US 10,324,627 B2
(45) Date of Patent: Jun. 18, 2019

(54) MEMORY SYSTEM AND OPERATION METHOD THEREOF

(71) Applicant: SK hynix Inc., Gyeonggi-do (KR)

(72) Inventor: Jiman Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/878,855

(22) Filed: Jan. 24, 2018

(65) Prior Publication Data
US 2019/0018594 A1 Jan. 17, 2019

(30) Foreign Application Priority Data
Jul. 12, 2017 (KR) .................. 10-2017-0088452

(51) Int. Cl.
*G11C 16/10* (2006.01)
*G06F 3/06* (2006.01)

(52) U.S. Cl.
CPC ............ *G06F 3/0607* (2013.01); *G06F 3/065* (2013.01); *G06F 3/0634* (2013.01); *G06F 3/0658* (2013.01); *G06F 3/0679* (2013.01)

(58) Field of Classification Search
CPC ...... G06F 3/0607; G06F 3/0634; G06F 3/065; G06F 3/0658; G06F 3/0679
USPC .................................................... 365/185.19
See application file for complete search history.

(56) References Cited

U.S. PATENT DOCUMENTS

| | | | |
|---|---|---|---|
| 8,379,454 B2 * | 2/2013 | Kochar | G11C 16/3459 365/185.19 |
| 8,456,912 B2 * | 6/2013 | Han | G11C 11/5628 365/185.12 |
| 2012/0218818 A1 * | 8/2012 | Han | G11C 11/5628 365/185.03 |
| 2012/0281479 A1 * | 11/2012 | Kochar | G11C 16/3459 365/185.19 |
| 2013/0182506 A1 * | 7/2013 | Melik-Martirosian | G11C 16/10 365/185.18 |
| 2013/0322181 A1 * | 12/2013 | Parker | G11C 16/04 365/185.19 |

FOREIGN PATENT DOCUMENTS

| | | |
|---|---|---|
| KR | 1020120098164 | 9/2012 |
| KR | 1020140026449 | 3/2014 |
| KR | 1020150011018 | 1/2015 |

* cited by examiner

*Primary Examiner* — Xiaochun L Chen
(74) *Attorney, Agent, or Firm* — IP & T Group LLP

(57) ABSTRACT

A memory system includes: a nonvolatile memory device suitable for performing a program operation to a page according to an incremental step pulse program scheme, and counting an actual application number of a program pulse for the program operation; and a controller suitable for controlling the nonvolatile memory device to perform the program operation, and reflecting the actual application number to a reference application number of the program pulse for the program operation, which is initially stored in the nonvolatile memory device at a manufacturing phase of the memory system, wherein the nonvolatile memory device determines a failure of the program operation based on a maximum application number of the program pulse for the program operation, which is greater than the reference application number by a predetermined number.

20 Claims, 12 Drawing Sheets

MEMORY SYSTEM AND OPERATION METHOD THEREOF

CROSS-REFERENCE TO RELATED APPLICATIONS

The present application claims priority under 35 U.S.C. § 119(a) to Korean Patent Application No. 10-2017-0088452 filed on Jul. 12, 2017, the disclosure of which is incorporated herein by reference in its entirety.

BACKGROUND

1. Field

Various exemplary embodiments of the present invention relate to a memory system. Particularly, exemplary embodiments relate to a controller capable of efficiently managing data, and an operating method thereof.

2. Description of the Related Art

The paradigm for computing environments is shifting toward ubiquitous computing which allows users to use computer systems anytime anywhere. For this reason, the demand for portable electronic devices, such as mobile phones, digital cameras and laptop computers are soaring. Those electronic devices generally include a memory system using a memory device as a data storage device. The data storage device may be used as a main memory unit or an auxiliary memory unit of a portable electronic device.

Since the data storage device using a memory device does not have a mechanical driving unit, it may have excellent stability and durability. Also, the data storage device has a quick data access rate with low power consumption. Non-limiting examples of the data storage device having such advantages include Universal Serial Bus (USB) memory devices, memory cards of diverse interfaces, Solid-State Drives (SSD) and the like.

SUMMARY

Various embodiments of the present invention are directed to a memory system capable of managing efficiently the number of a program pulse.

In accordance with an embodiment of the present invention, a memory system includes: a non-volatile memory device in which a plurality of pages are included and a minimum expected application number A of a program pulse is stored, wherein a program operation is performed on the pages using the program pulse according to an incremental step pulse program (ISPP) method; and a controller suitable for loading the minimum expected application number A from the non-volatile memory device and storing the minimum expected application number A as a minimum reference application number B in an internal memory during an initial operation, for checking an actual application number C, which is the number of the program pulse used whenever the program operation is completed in the non-volatile memory device, after the initial operation and controlling the minimum reference application number B according to a result of the check, and for comparing the minimum reference application number B with the minimum expected application number A for each predetermined moment and updating the minimum expected application number A to the non-volatile memory device according to a result of the comparison.

The controller may increase the minimum reference application number B up to the actual application number C when the actual application number C is greater than the minimum reference application number B as the result of checking the actual application number C whenever the program operation is completed in the non-volatile memory device after the initial operation.

The controller may increase the minimum expected application number A up to the minimum reference application number B and updates the increased minimum expected application number A to the non-volatile memory device when the minimum expected application number A is smaller than the minimum reference application number B as the result of comparing the minimum expected application number A with the minimum reference application number B at the predetermined moment.

The predetermined moment may repeat whenever the number of times that the program operation is completed in the non-volatile memory device reaches a specific number of times F.

In case that the number of use of the program pulse reaches a maximum expected application number D when the program operation is performed according to a request from the controller, the non-volatile memory device may determine the program operation as failure, and the maximum expected application number D may have a value obtained by adding a predetermined application number E to the minimum expected application number A.

In accordance with an embodiment of the present invention, a memory system includes: a first non-volatile memory device in which a plurality of first pages are included and a first minimum expected application number A1 of a program pulse is stored, wherein a program operation is performed on the first pages using the program pulse according to an incremental step pulse program (ISPP) method; a second non-volatile memory device in which a plurality of second pages are included and a second minimum expected application number A2 of a program pulse is stored, wherein a program operation is performed on the second pages using the program pulse according to the incremental step pulse program (ISPP) method; and a controller suitable for loading the first minimum expected application number A1 and the second minimum expected application number A2 respectively from the first and second non-volatile memory devices and storing the first minimum expected application number A1 and the second minimum expected application number A2 as a first minimum reference application number B1 and a second minimum reference application number B2 respectively in an internal memory during an initial operation, for checking a first actual application number C1 and a second actual application number C2, which are the number of the program pulse used whenever the program operation is completed in each of the first and second non-volatile memory device, after the initial operation and controlling the first minimum reference application number B1 and the second minimum reference application number B2 according to a result of the check, and for comparing the first minimum reference application number B1 and the second minimum reference application number B2 respectively with the first minimum expected application number A1 and the second minimum expected application number A2 for each of first and second predetermined moments and updating the first minimum expected application number A1 and the second minimum expected application number A2 to the first and second non-volatile memory devices according to a result of the comparison.

The controller may increase the first minimum reference application number B1 up to the first actual application number C1 when the first actual application number C1 is greater than the first minimum reference application number B1 as the result of checking the first actual application number C1 whenever the program operation is completed in the first non-volatile memory device after the initial operation.

The controller may increase the first minimum expected application number A1 up to the first minimum reference application number B1 and updates the increased first minimum expected application number A1 to the first non-volatile memory device when the first minimum expected application number A1 is smaller than the first minimum reference application number B1 as the result of comparing the first minimum expected application number A1 with the first minimum reference application number B1 at the first predetermined moment.

The controller may increase the second minimum reference application number B2 up to the second actual application number C2 when the second actual application number C2 is greater than the second minimum reference application number B2 as the result of checking the second actual application number C2 whenever the program operation is completed in the second non-volatile memory device after the initial operation.

The controller may increase the second minimum expected application number A2 up to the second minimum reference application number B2 and updates the increased second minimum expected application number A2 to the second non-volatile memory device when the second minimum expected application number A2 is smaller than the second minimum reference application number B2 as the result of comparing the second minimum expected application number A2 with the second minimum reference application number B2 at the second predetermined moment.

each of the first pages includes a plurality of first memory cells, and each of the first memory cells stores N-bit data at a time, and in case that the number of use of the program pulse reaches a first maximum expected application number D1 when the program operation is performed according to a request from the controller, the first non-volatile memory device determines the program operation as failure, and the first maximum expected application number D1 has a value obtained by adding a first predetermined application number E1 to the first minimum expected application number A1.

Each of the second pages includes a plurality of second memory cells, and each of the second memory cells stores M-bit data at a time, and in case that the number of use of the program pulse reaches a second maximum expected application number D2 when the program operation is performed according to a request from the controller, the second non-volatile memory device may determine the program operation as failure, and the second maximum expected application number D2 may have a value obtained by adding a second predetermined application number E2 to the second minimum expected application number A2, and the first minimum expected application number A1 may be smaller than the second minimum expected application number A2, and the first predetermined application number E1 may be smaller than the second predetermined application number E2, and M may be a natural number greater than N.

The first predetermined moment may repeat whenever the number of times that the program operation is completed in the first non-volatile memory device reaches a first specific number of times F1.

The second predetermined moment may repeat whenever the number of times that the program operation is completed in the second non-volatile memory device reaches a second specific number of times F2, and the first specific number of times F1 may be greater than the second specific number of times F2.

In accordance with an embodiment of the present invention, an operating method of a memory system including a non-volatile memory device that includes a plurality of pages on which a program operation is performed using a program pulse in an incremental step pulse program (ISPP) method and the number of minimum expectation A of the program pulse includes: loading the minimum expected application number A from the non-volatile memory device and storing the minimum expected application number A as a minimum reference application number B in an internal memory during an initial operation; checking an actual application number C, which is the number of the program pulse used whenever the program operation is completed in the non-volatile memory device, after the initial operation and controlling the minimum reference application number B according to a result of the check; and comparing the minimum reference application number B with the minimum expected application number A for each predetermined moment and updating the minimum expected application number A to the non-volatile memory device according to a result of the comparison.

The controlling of the minimum reference application number B may be carried out to increase the minimum reference application number B up to the actual application number C when the actual application number C is greater than the minimum reference application number B as the result of checking the actual application number C whenever the program operation is completed in the non-volatile memory device after the initial operation.

The updating of the minimum expected application number A to the non-volatile memory device may be carried out to increase the minimum expected application number A up to the minimum reference application number B and update the increased minimum expected application number A to the non-volatile memory device when the minimum expected application number A is smaller than the minimum reference application number B as the result of comparing the minimum expected application number A with the minimum reference application number B at the predetermined moment.

The predetermined moment may repeat whenever the number of times that the program operation is completed in the non-volatile memory device reaches a specific number of times.

The operating method may further include: determining the program operation as failure when the number of use of the program pulse reaches a maximum expected application number D when the program operation is performed in the non-volatile memory device, wherein the maximum expected application number D has a value obtained by adding a predetermined application number E to the minimum expected application number A.

In accordance with an embodiment of the present invention, A memory system may include: a nonvolatile memory device suitable for performing a program operation to a page according to an incremental step pulse program scheme, and counting an actual application number of a program pulse for the program operation; and a controller suitable for controlling the nonvolatile memory device to perform the program operation, and reflecting the actual application number to a reference application number of the program pulse for the program operation, which is initially stored in the nonvolatile memory device at a manufacturing phase of the memory system, wherein the nonvolatile memory device determines a failure of the program operation based on a maximum application number of the program pulse for the program operation, which is greater than the reference application number by a predetermined number.

DETAILED DESCRIPTION

Figure 1:
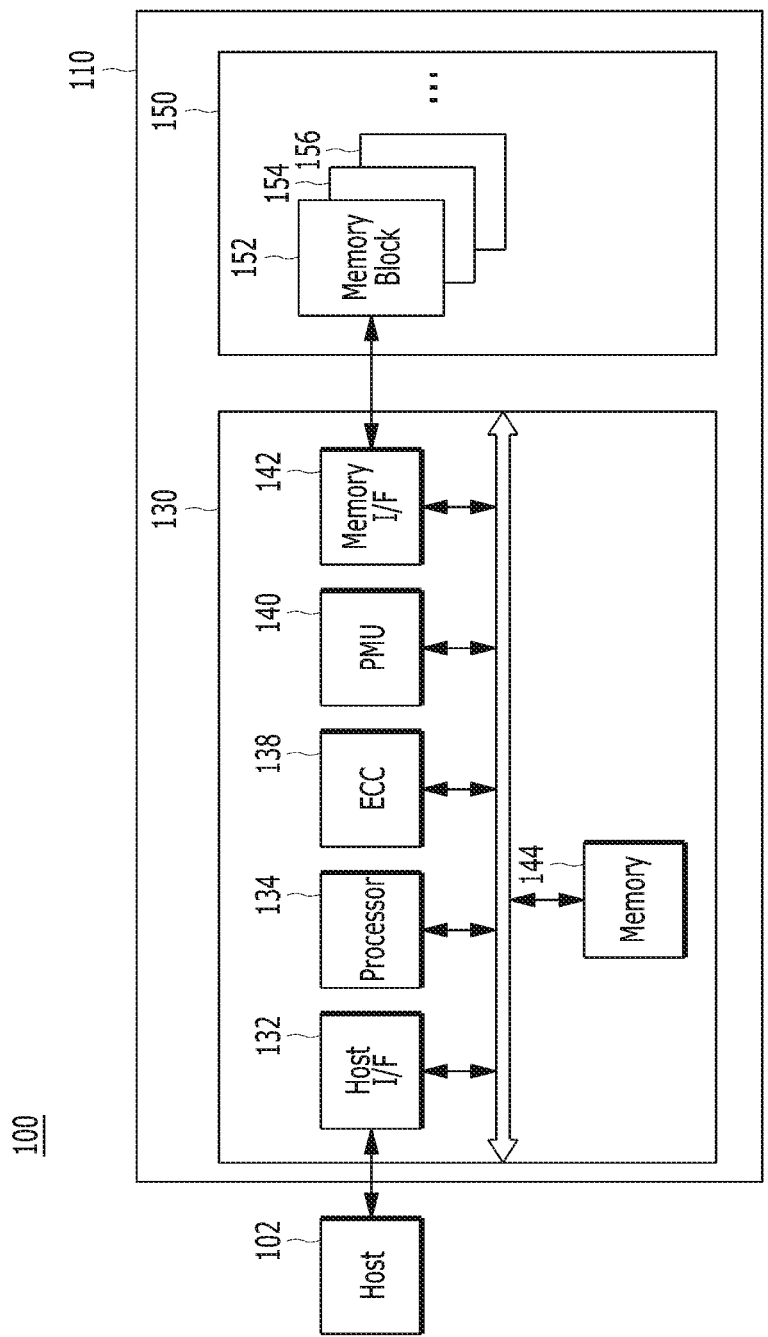
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) unit 132, a processor 134, an error correction code (ECC) unit 138, a power management unit (PMU) 140, a memory device controller such as a memory interface (I/F) unit 142 and a memory 144 all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, modules, systems or devices for the error correction operation.

The PMU 140 may provide and manage power of the controller 130.

The memory interface 142 may serve as a memory/storage interface between the controller 130 and the memory device 150 to allow the controller 130 to control the memory device 150 in response to a request from the host 102. The memory interface 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the present disclosure is not limited thereto. That is, the memory 144 may be disposed within or out of the controller 130. For instance, in an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

A FTL may perform an operation as an interface between the host 102 and the memory device 150. The host 102 may request to the memory device 150 write and read operations through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks seriously deteriorates the utilization efficiency of the memory device 150 having a 3D stack structure and the reliability of the memory system 100, and thus reliable bad block management is required.

Figure 2:
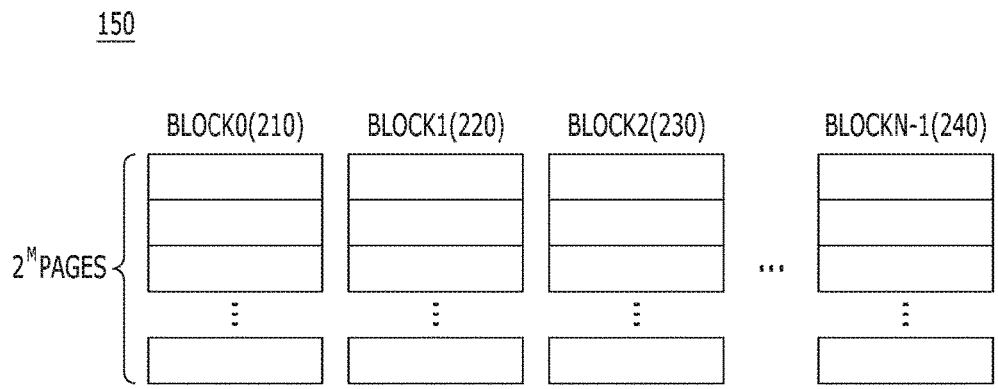
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks BLOCK 0 to BLOCKN-1, and each of the blocks BLOCK 0 to BLOCKN-1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
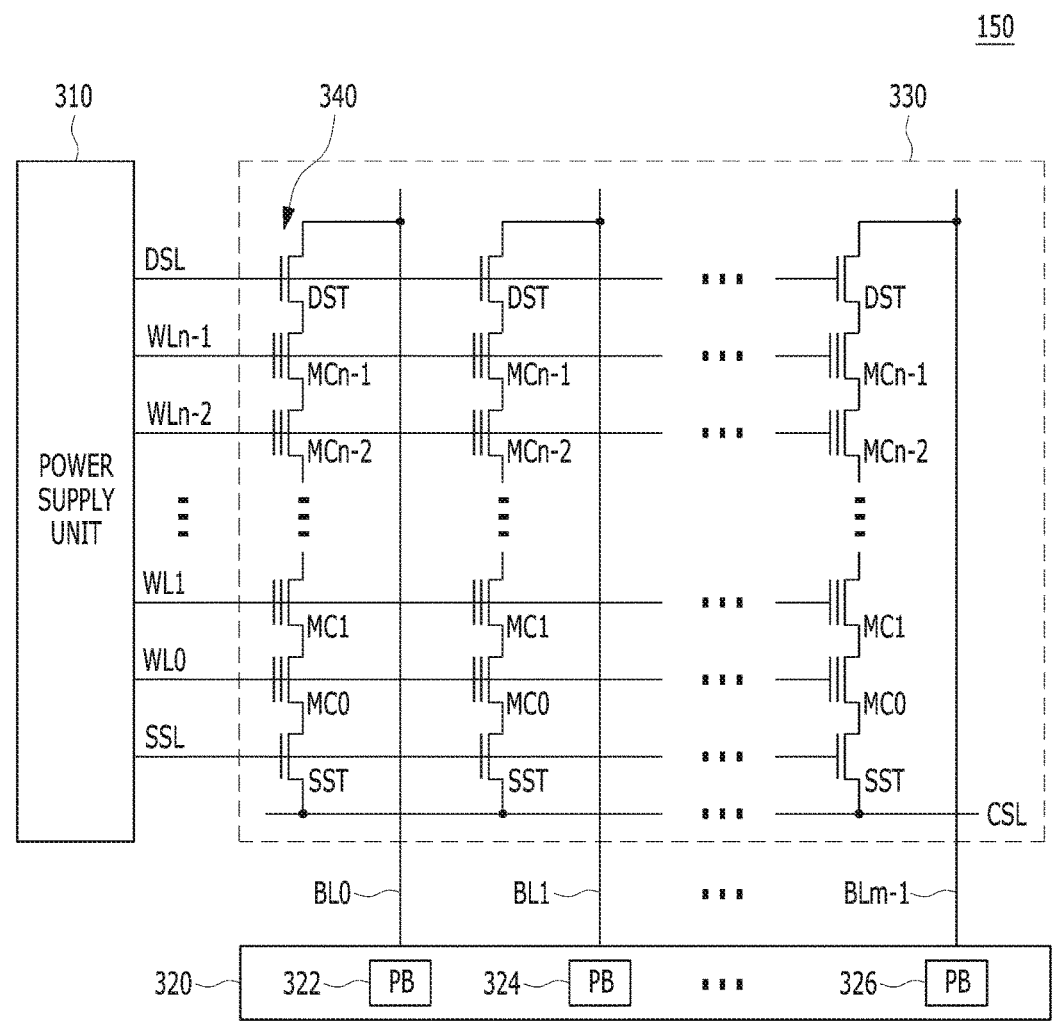
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 which corresponds to any of the plurality of memory blocks 152 to 156.

Referring to FIG. 3, the memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply unit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply unit 310 may perform a voltage generating operation under the control of a control circuit (not shown). The power supply unit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
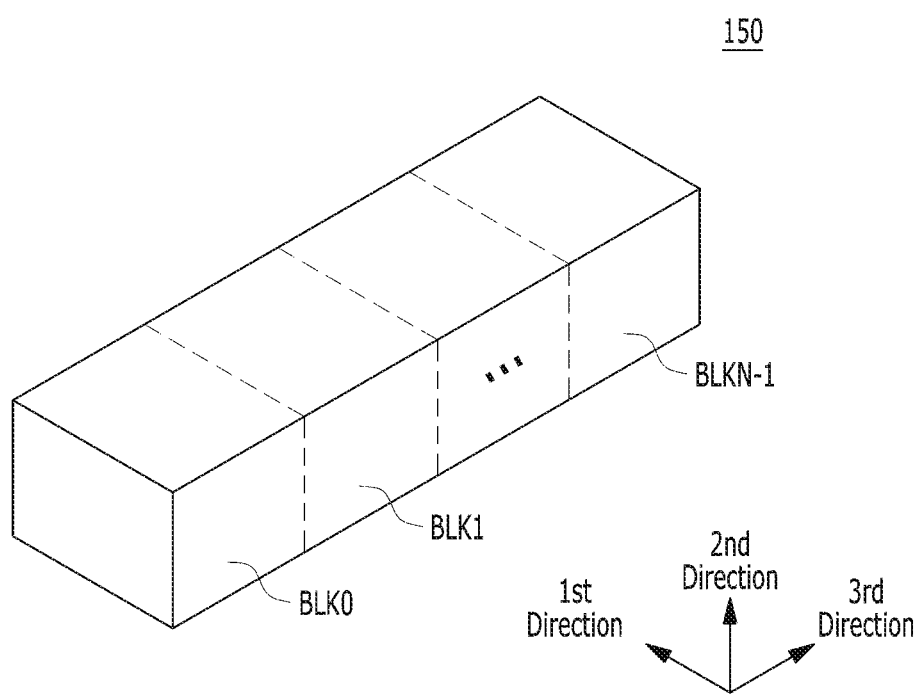
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

Figure 5:
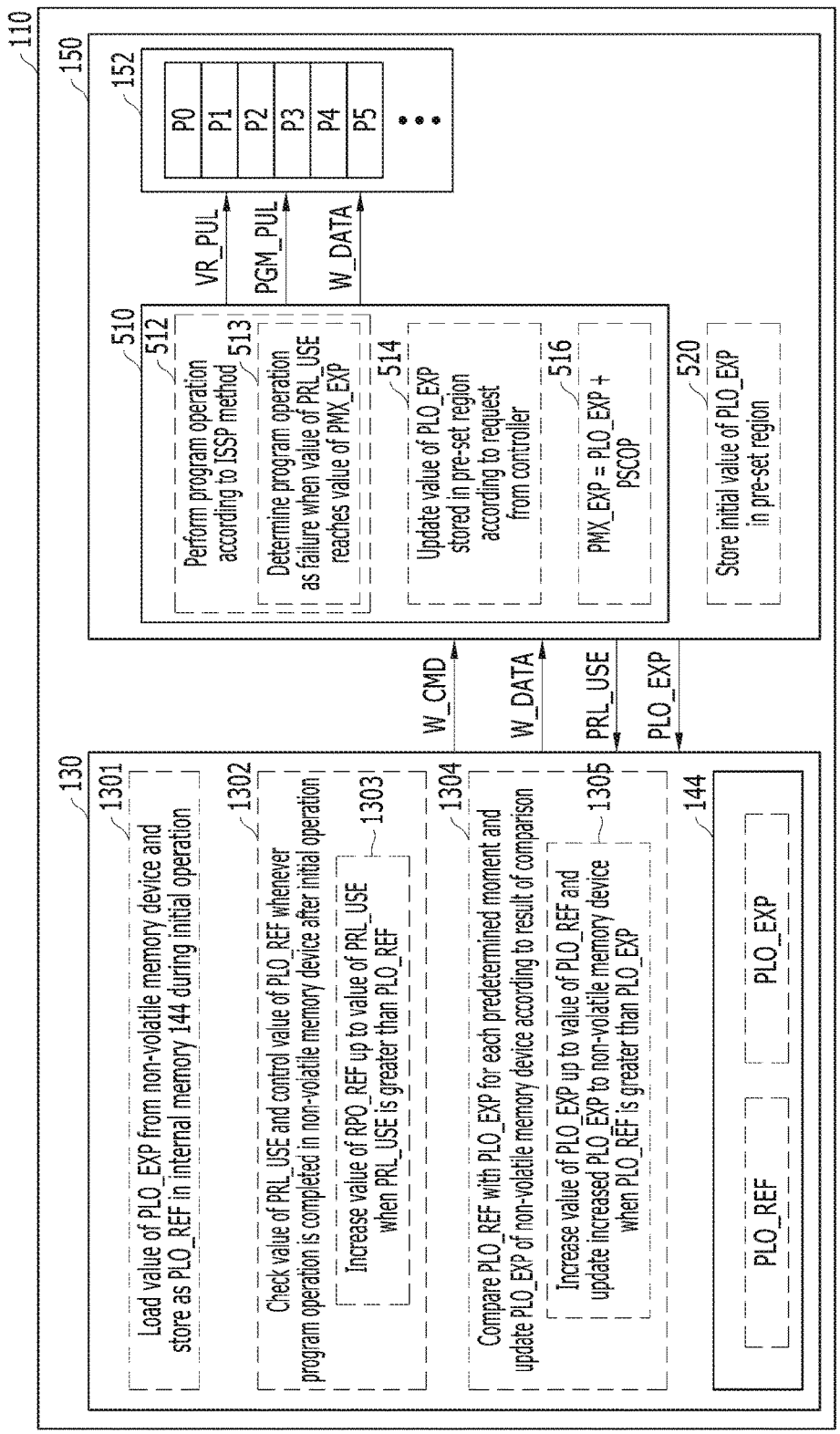
FIG. 5 is a diagram illustrating a program operation of the memory system of FIG. 1.

FIG. 5 is a diagram illustrating a program operation of the memory system 110.

Referring to FIG. 5, the non-volatile memory device 150 may include an operation control block 510.

The non-volatile memory device 150 may perform the program operation on each of the pages P0 to P5 in response to a program command W_CMD and an input data W_DATA applied from the controller 130.

The operation control block 510 may perform the program operation using a program pulse according to the incremental step pulse program (ISPP) method under the control of the controller 130 in operation 512.

Figure 8:
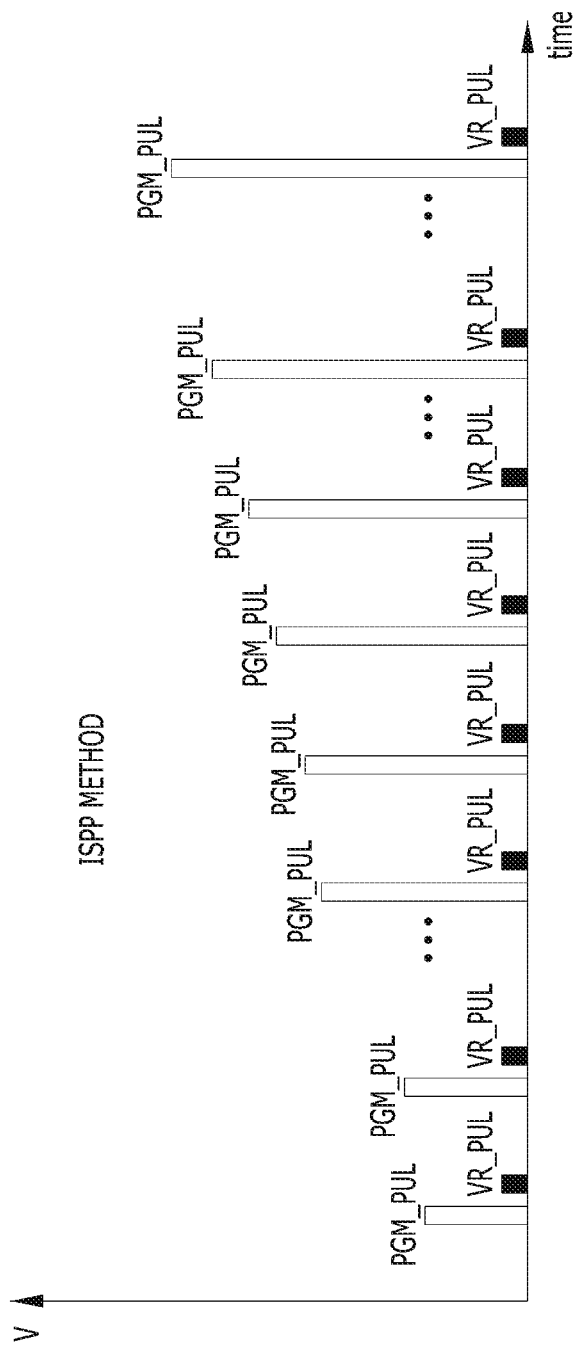
FIG. 8 is a diagram illustrating a program operation with Incremental Step Pulse Programming (ISPP).

Using the program pulse of the ISPP method from the operation control block 510 to perform the program operation may mean that the non-volatile memory device 150 of the present disclosure performs the program operation according to a well-known general program method. In other words, a non-volatile memory device such as a flash memory may use the ISPP method to program the input data W_DATA into each of memory cells included in a selected word line which corresponds to a page selected to perform the program operation, using a program pulse PGM_PUL whose voltage level increases step by step. In addition, the ISPP method may use a verify pulse VR_PUL to verify whether threshold voltage levels of the memory cells included in the selected word line reach a target voltage level whenever the program pulse PGM_PUL is used. In other words, the verify pulse VR_PUL may be used to verify whether the input data W_DATA is normally programmed into the word line. In short, the ISPP method may use the program pulse PGM_PUL in advance and then use the verify pulse VR_PUL to verify whether there is a cell whose threshold voltage level reaches the target voltage level among the memory cells included in the selected word line based on the program pulse PGM_PUL. When the cell whose threshold voltage level reaches the target voltage level is verified through the verify pulse VR_PUL, the program pulse PGM_PUL may be controlled not to be used any longer, and the program pulse PGM_PUL to be used later may be controlled to have a higher voltage level than the program pulse PGM_PUL that is used previously. For example, FIG. 8 shows a plurality of loops, in each of which a gradually increasing program pulse PGM_PUL is applied to a selected word line for programming memory cells of the selected word line and a verify pulse VR_PUL is applied to the selected word line for verifying the programming of the memory cells during a programing operation to the memory cells of the selected word line according to the ISPP method. The program operation of the ISPP method is widely known to those skilled in the art and generally used in the flash memory device.

In accordance with an embodiment of the present invention, when an actual application number PRL_USE of the program pulse PGM_PUL applied to memory cell of a selected word line reaches a maximum expected application number PMX_EXP, the operation control block 510 may determine the program operation to the memory cells of the selected word line as a failure in operation 513.

In accordance with an embodiment of the present invention, when the actual application number PRL_USE reaches the maximum expected application number PMX_EXP although a rate of memory cells having at least a target voltage level among all memory cells of the selected word line does not reach a predetermined rate, the program operation is determined as failure.

The maximum expected application number PMX_EXP may be controlled in run time through operations of the controller 130 and the non-volatile memory device 150.

In accordance with an embodiment of the present invention, the non-volatile memory device 150 in accordance with an embodiment of the present invention may prevent an excessive increase in the number of the program pulse PGM_PUL used in the program operation on the selected word line through an operation to set a factor of "the number of maximum expectation PMX_EXP".

The non-volatile memory device 150 may store an initial value of a minimum expected application number PLO_EXP of the program pulse PGM_PUL in an internal pre-set region (not illustrated) in operation 520. The initial value of the minimum expected application number PLO_EXP may be stored in the non-volatile memory device 150 at manufacturing phase of the memory system 110. In accordance with an embodiment of the present invention, as a program operation is repeatedly performed to each word line of the non-volatile memory device 150 as the memory system 110 runs and time goes by, an actual application number of the program pulse to each word line may increase and may be reflected to the minimum expected application number PLO_EXP, which may gradually increases accordingly.

The operation control block 510 may obtain the maximum expected application number PMX_EXP by adding a predetermined application number PSCOP of the program pulse PGM_PUL to the minimum expected application number PLO_EXP in operation 516.

For example, when the non-volatile memory device 150 has a single level cell (SLC) characteristic, the minimum expected application number PLO_EXP may have any one of values 1 and 2, and the predetermined application number PSCOP may have any one of values 3 to 5. Accordingly, the maximum expected application number PMX_EXP may have any one of values 4 to 7. For another example, when the non-volatile memory device 150 has a multi-level cell (MLC) characteristic, the minimum expected application number PLO_EXP may have any one of values 7 and 8, and the predetermined application number PSCOP may have any one of values 3 to 5. Accordingly, the maximum expected application number PMX_EXP may have any one of values 10 to 13. For another example, when the non-volatile memory device 150 has a triple level cell (TLC) characteristic, the minimum expected application number PLO_EXP may have any one of values 17 to 25, and the predetermined application number PSCOP may have any one of values 3 to 5. Accordingly, the maximum expected application number PMX_EXP may have any one of values 20 to 30. The number of minimum expectation PLO_EXP, the predetermined number of times PSCOP and the number of maximum expectation PMX_EXP as described above are merely examples and configurations and operations of the present invention are not limited thereto. Differently from what is shown in the drawing, two or more non-volatile memory devices having the same characteristic may be included in the memory system 110. Although the two or more non-volatile memory devices have the same characteristic, the non-volatile memory devices do not have the same number of minimum expectation PLO_EXP, the same predetermined number of times PSCOP, and the same number of maximum expectation PMX_EXP. In other words, each of the two or more non-volatile memory devices having the same characteristic may be effected by variations in the process, voltage and temperature (PVT) during fabrication processes, and thus each of the two or more non-volatile memory devices having the same characteristic may be set to have the number of minimum expectation PLO_EXP, the predetermined number of times PSCOP and the number of maximum expectation PMX_EXP, which are different from each other, during a test process.

The controller 130 may load the minimum expected application number PLO_EXP from the non-volatile memory device 150, into the internal memory 144 as a minimum reference application number PLO_REF during an initial operation in operation 1301.

Even though the program operation is never performed in the non-volatile memory device 150 when the non-volatile memory device 150 is manufactured at the beginning, an initial value of the number of minimum expectation PLO_EXP on the program operation may be determined and stored in the pre-set region of the non-volatile memory device 150 through a test during the process of manufacturing the non-volatile memory device 150. Even when the non-volatile memory device 150 is installed and used, the initial value of the number of minimum expectation PLO_EXP may be updated and stored in the pre-set region of the non-volatile memory device 150 through an operation of the controller 130, which is to be described below.

For example, as described earlier, when the program operation is never performed in the non-volatile memory device 150 while the non-volatile memory device 150 has the single level cell (SLC) characteristic in which the 1-bit data is stored in each of the memory cells thereof, the initial value of the number of minimum expectation PLO_EXP may be determined as the value 2 and stored in the pre-set region of the non-volatile memory device 150 through the test during the process of manufacturing the non-volatile memory device 150. In this case, the controller 130 may load and store the number of minimum expectation PLO_EXP having the value 2 stored in the pre-set region of the non-volatile memory device 150 as the number of minimum reference PLO_REF having the value 2 in the internal memory 144. Subsequently, when the program operation is performed in the non-volatile memory device 150, the initial value of the number of minimum expectation PLO_EXP may be updated and determined as the value 3 and stored in the pre-set region of the non-volatile memory device 150 through an operation of the controller 130, which is to be described below. In this case, the controller 130 may load and store the number of minimum expectation PLO_EXP having the value 3 stored in the pre-set region of the non-volatile memory device 150 as the number of minimum reference PLO_REF having the value 3 in the internal memory 144.

For another example, as described earlier, when the program operation is never performed in the non-volatile memory device 150 while the non-volatile memory device 150 has the multi-level cell (MLC) characteristic in which the 2-bit data is stored in each of the memory cells thereof, the initial value of the number of minimum expectation PLO_EXP may be determined as the value 8 and stored in the pre-set region of the non-volatile memory device 150 through the test during the process of manufacturing the non-volatile memory device 150. In this case, the controller 130 may load and store the number of minimum expectation PLO_EXP having the value 8 stored in the pre-set region of the non-volatile memory device 150 as the number of minimum reference PLO_REF having the value 8 in the internal memory 144. Subsequently, when the program operation is performed in the non-volatile memory device 150, the initial value of the number of minimum expectation PLO_EXP may be updated and determined as the value 9 and stored in the pre-set region of the non-volatile memory device 150 through an operation of the controller 130, which is to be described below. In this case, the controller 130 may load and store the number of minimum expectation PLO_EXP having the value 9 stored in the pre-set region of the non-volatile memory device 150 as the number of minimum reference PLO_REF having the value 9 in the internal memory 144.

For yet another example, as described earlier, when the program operation is never performed in the non-volatile memory device 150 while the non-volatile memory device 150 has the triple level cell (TLC) characteristic in which the 3-bit data is stored in each of the memory cells thereof, the initial value of the number of minimum expectation PLO_EXP may be determined as the value 21 and stored in the pre-set region of the non-volatile memory device 150 through the test during the process of manufacturing the non-volatile memory device 150. In this case, the controller 130 may load and store the number of minimum expectation PLO_EXP having the value 21 stored in the pre-set region of the non-volatile memory device 150 as the number of minimum reference PLO_REF having the value 21 in the internal memory 144. Subsequently, when the program operation is performed in the non-volatile memory device 150, the initial value of the number of minimum expectation PLO_EXP may be updated and determined as the value 24 and stored in the pre-set region of the non-volatile memory device 150 through an operation of the controller 130, which is to be described below. In this case, the controller 130 may load and store the number of minimum expectation PLO_EXP having the value 24 stored in the pre-set region of the non-volatile memory device 150 as the number of minimum reference PLO_REF having the value 24 in the internal memory 144.

In an embodiment, the minimum expected application number PLO_EXP and the minimum reference application number PLO_REF may be simultaneously stored in the internal memory 144. In another embodiment, the controller 130 may load the minimum expected application number PLO_EXP loaded from the non-volatile memory device 150 just as the minimum reference application number PLO_REF in the internal memory 144.

The initial operation may mean any predetermined operation including booting-up-operation of the memory system 110.

In operation 1302, whenever a program operation is completed to a selected word line after the initial operation, the controller 130 may check the actual application number PRL_USE for the selected word line and control the minimum reference application number PLO_REF based on a result of the check.

When the actual application number PRL_USE for the selected word line is greater than the minimum reference application number PLO_REF, the controller 130 may increase the minimum reference application number PLO_REF up to the actual application number PRL_USE of the program operation to the selected word line in operation 1303.

In operation 1304, the controller 130 may compare the minimum reference application number PLO_REF of the internal memory 144 with the minimum expected application number PLO_EXP stored in the non-volatile memory device 150 for each predetermined moment and may update the minimum expected application number PLO_EXP based on a result of the comparison. In other words, when the minimum expected application number PLO_EXP is smaller than the minimum reference application number PLO_REF, the controller 130 may increase the minimum expected application number PLO_EXP up to the minimum reference application number PLO_REF and may update the increased minimum expected application number PLO_EXP to the non-volatile memory device 150 in operations 1305 and 514.

In an embodiment, when the controller 130 loads the minimum expected application number PLO_EXP of the non-volatile memory device 150 into the internal memory 144 as the minimum reference application number PLO_REF and minimum expected application number PLO_EXP during the initial operation, the controller 130 may compare the minimum reference application number PLO_REF and the minimum expected application number PLO_EXP of the internal memory 144 for the each predetermined moment.

In an embodiment, when the controller 130 loads the minimum expected application number PLO_EXP of the non-volatile memory device 150 into the internal memory 144 just as the minimum reference application number PLO_REF, the controller 130 may compare the minimum expected application number PLO_EXP of the non-volatile memory device 150 with the minimum reference application number PLO_REF of the internal memory 144 for the each predetermined moment.

The predetermined moment may be a moment when the number of times that the controller 130 requests the program operation to a selected word line reaches a predetermined number of times. For example, the number of times that the controller 130 requests the program operation to a selected word line may be a multiple of 100, i.e., 100, 200, 300, and the like.

As described above, the initial value of the minimum expected application number PLO_EXP may be stored in the non-volatile memory device 150 at manufacturing phase of the memory system 110. The maximum expected application number PMX_EXP in addition to the minimum expected application number PLO_EXP for each word line of the non-volatile memory device 150 may be adjusted according to the actual application number PRL_USE of each program operation to each word line.

In accordance with an embodiment of the present invention, the memory system 110 may limit the application number of the program pulse PGM_PUL during the program operation to each word line of the non-volatile memory device 150 based on the maximum expected application number PMX_EXP of small size as the memory system 110 starts to run right after the memory system 110 is manufactured. As the program operation is repeatedly performed to each word line of the non-volatile memory device 150 as the memory system 110 runs and time goes by, the actual application number PRL_USE to each word line of the non-volatile memory device 150 may increase and may be reflected to the maximum expected application number PMX_EXP, which may gradually increases for each word line accordingly. Therefore, as the memory system 110 keeps running and time passes, the memory system 110 may limit the application number of the program pulse PGM_PUL to each word line of the non-volatile memory device 150 based on the maximum expected application number PMX_EXP, which the actual application number PRL_USE is reflected to at each time the program operation to each word line is completed and thus becomes greater. The maximum expected application number PMX_EXP may not exceed an application number of the program pulse PGM_PUL to reach a maximum level for the programming of memory cells of a word line.

Figure 6:
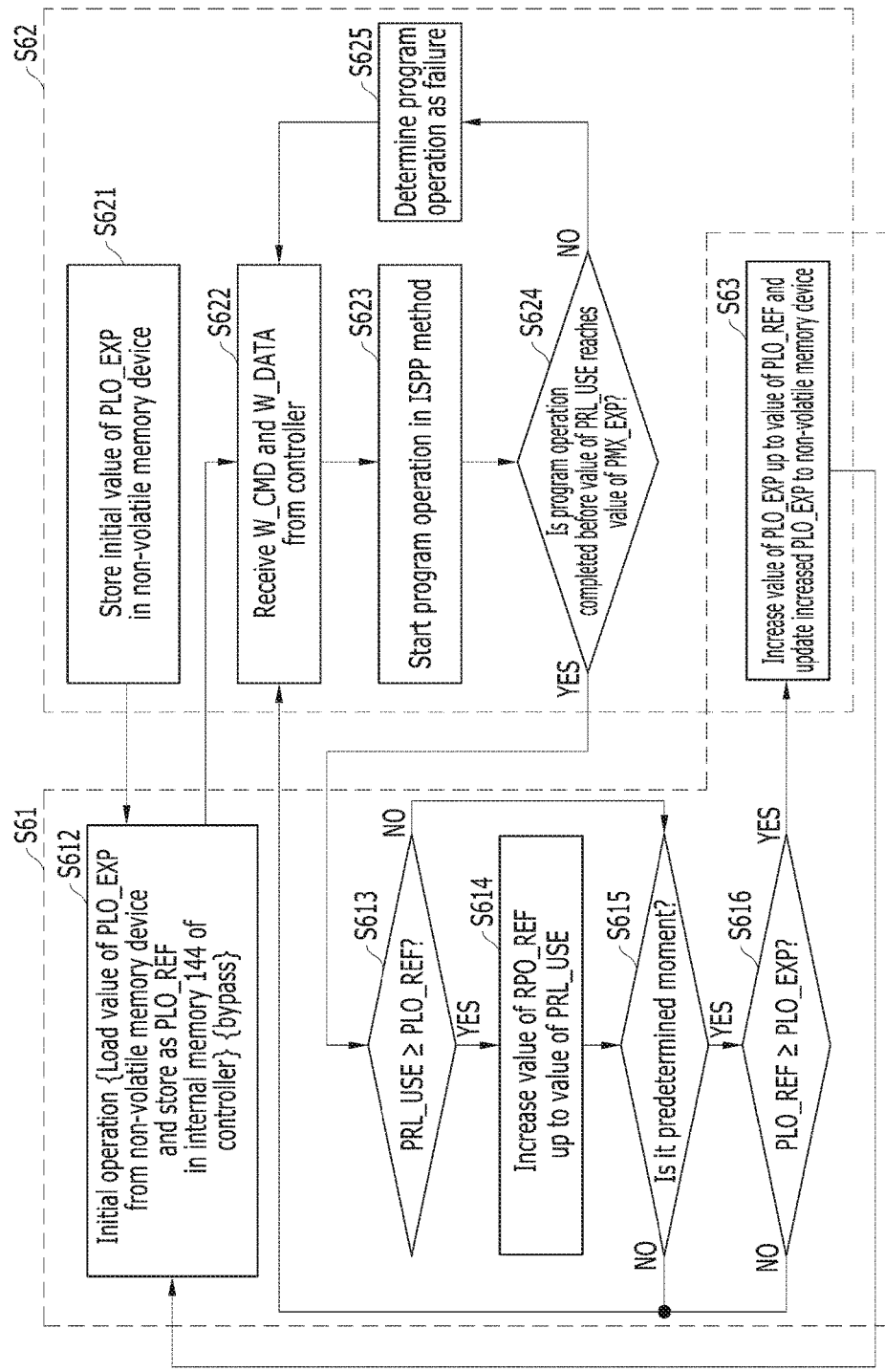
FIG. 6 is a flow chart illustrating a program operation of the memory system of FIG. 1.

FIG. 6 is a flow chart illustrating a program operation of the memory system 110.

Referring to FIGS. 5 and 6, operation S61 may be an operation of the controller 130. Operation S62 may be an operation of the non-volatile memory device 150. Operation S63 may be an operation of both the controller 130 and the non-volatile memory device 150.

In operation S621 of operation S62, the initial value of the minimum expected application number PLO_EXP according to the ISPP method is stored in the non-volatile memory device 150. The operation S621, which corresponds to the operation 520, may be performed at the manufacturing of the memory system 110.

When the initial operation starts, in an operation S612 of the operation S61, the controller 130 loads the minimum expected application number PLO_EXP from the non-volatile memory device 150 into the internal memory 144 as the minimum reference application number PLO_REF.

In an operation S622 of the operation S62, the non-volatile memory device 150 receives a program command W_CMD and input data W_DATA from the controller 130.

In an operation S623 of the operation S62, the non-volatile memory device 150 may perform a program operation according to the ISPP method.

In an operation S624 of the operation S62, the operation control block 510 may check whether the program operation is completed until the actual application number PRL_USE reaches the maximum expected application number PMX_EXP.

When the program operation is not completed until the actual application number PRL_USE reaches the maximum expected application number PMX_EXP (that is, "NO" at operation S624), in an operation S625 of the operation S62, the operation control block 510 may determine the program operation as failure.

When the program operation is completed before or when the actual application number PRL_USE reaches the maximum expected application number PMX_EXP (that is, "YES" at operation S624), operation control block 510 may provide the controller 130 with the actual application number PRL_USE of the completed program operation as well as a response informing the completion of the program operation.

In an operation S613 of the operation S61, the controller 130 may check whether the provided actual application number PRL_USE has a greater value than the minimum reference application number PLO_REF.

When the actual application number PRL_USE has a same or smaller value than the minimum reference application number PLO_REF (that is, "NO" at operation S613), the controller 130 may perform an operation S615 of operation S61 to check the predetermined moment.

When the actual application number PRL_USE has a greater value than the minimum reference application number PLO_REF (that is, "YES" at operation S613), in an operation S614 of the operation S61, the controller 130 may increase the minimum reference application number PLO_REF up to the actual application number PRL_USE.

After the operation S614 is performed, the controller 130 may perform the operation S615.

When it is not the predetermined moment (that is "NO" at operation S615), the process may return to the operation S622 of the operation S62.

When it is the predetermined moment (that is, "YES" at operation S615), in an operation S615 of the operation S61, the controller 130 may check whether the increased minimum reference application number PLO_REF has a greater value than the minimum expected application number PLO_EXP.

When the increased minimum reference application number PLO_REF has the same or smaller value as the minimum expected application number PLO_EXP, the process may return to the operation S622 of the operation S62.

When the increased minimum reference application number PLO_REF has a greater value than the minimum expected application number PLO_EXP (that is, "YES" at operation S616), in the operation S63, the controller 130 may increase the value of the minimum expected application number PLO_EXP up to the value of the increased minimum reference application number PLO_REF and update the increased minimum expected application number PLO_EXP in the non-volatile memory device 150.

After the operation S63, the operation may return to operation S612 of the operation S61, in which the initial operation may be performed again. When a power-off operation is included between the operation S63 and the operation S612, the operation S612 may be performed just as it is. However, when the power-off operation is not included between the operation S613 and the operation S612, the operation S612 may be bypassed, and the subsequent operation S622 may be performed.

Figure 7:
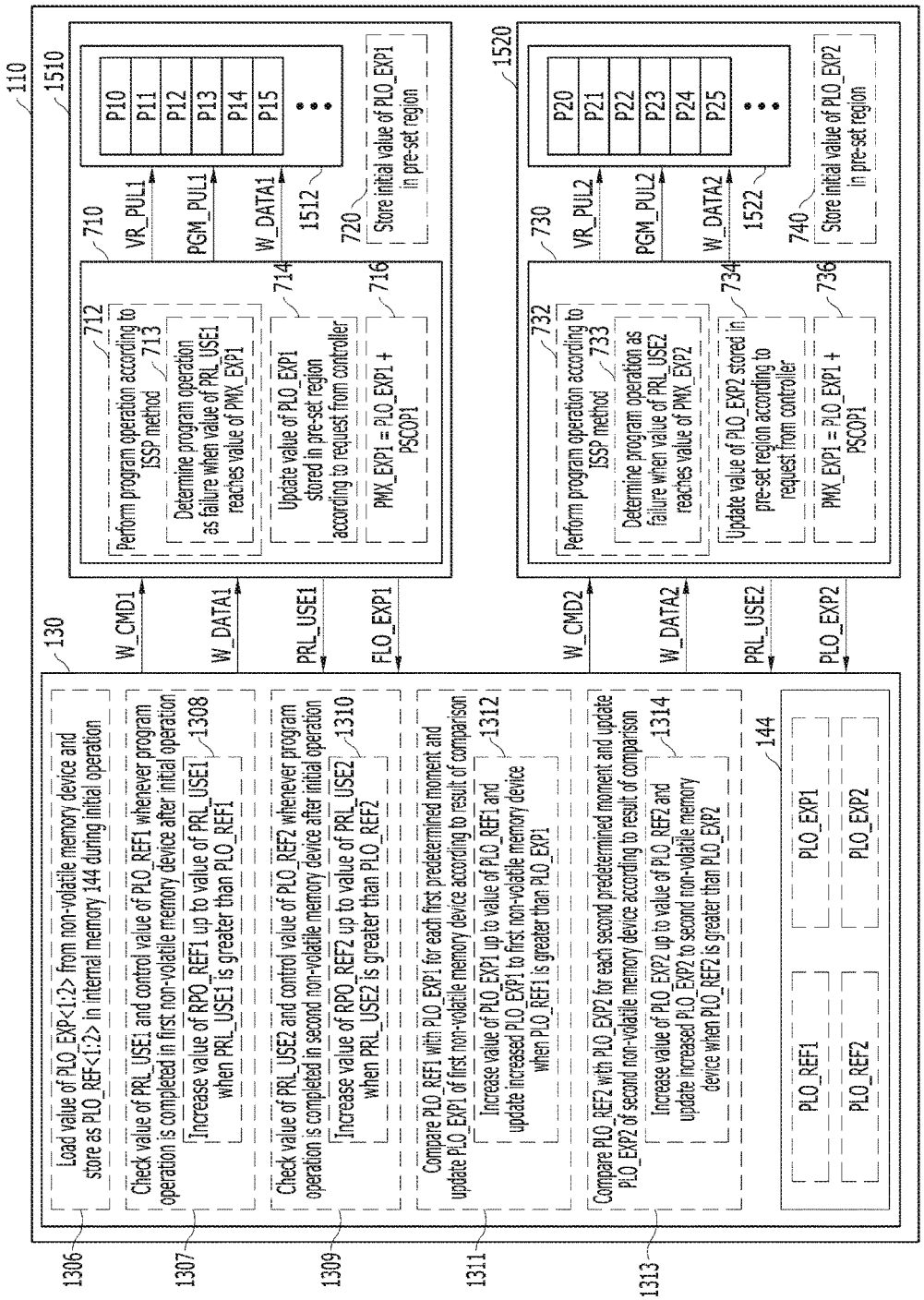
FIG. 7 is a diagram illustrating a program operation of the memory system of FIG. 1.

FIG. 7 is a flow chart illustrating a program operation of the memory system 110.

Referring to FIG. 7, the memory system 110 shown in FIG. 7 is different from that shown in FIG. 5 in that the memory system 110 shown in FIG. 7 may further include non-volatile memory devices 1510 and 1520.

That is, the memory system 110 shown in FIG. 5 in accordance with an embodiment of the present invention may include a single non-volatile memory device 150, but the memory system 110 shown in FIG. 7 in accordance with another embodiment of the present invention may include two non-volatile memory devices 1510 and 1520. Accordingly, overlapping descriptions on the configurations and operations of the memory system 110 shown in FIG. 7 that are the same as or substantially similar to those of the memory system 110 shown in FIG. 5 are omitted herein.

Referring to FIG. 7, the memory system 110 may include a controller 130, a first non-volatile memory device 1510, and a second non-volatile memory device 1520. The first non-volatile memory device 1510 may include a first operation control block 710 and a plurality of first memory blocks 1512. The second non-volatile memory device 1520 may include a second operation control block 730 and a plurality of second memory blocks 1522. The first and second operation control block 710 and 730 may be the same constituent elements as the operation control block 510 shown in FIG. 5.

To be specific, the first non-volatile memory device 1510 may perform a program operation on each of first pages P10, P11, P12, P13, P14, P15, (hereinafter, referred to as 'P10 to P15') in response to a first program command W_CMD1 and a first input data W_DATA1 applied from the controller 130.

The first operation control block 710 of the first non-volatile memory device 1510 may perform the program operation using a program pulse of an incremental step pulse program (ISPP) method under the control of the controller 130 in operation 712.

In case that it is verified that the first actual application number PRL_USE1 of a first program pulse PGM_PUL1 reaches the first maximum expected application number PMX_EXP1 when the first operation control block 710 of the first non-volatile memory device 1510 performs the program operation using the first program pulse PGM_PUL1 according to the ISPP method, the first operation control block 710 may determine the program operation as failure in operation 713. The first non-volatile memory device 1510 may store an initial value of the first minimum expected application number PLO_EXP1 of the first program pulse PGM_PUL1 according to the ISPP method in a pre-set region thereof in operation 720. The first operation control block 710 of the first non-volatile memory device 1510 may obtain the first maximum expected application number PMX_EXP1 by adding a first predetermined application number PSCOP1 to the first minimum expected application number PLO_EXP1 stored in the pre-set region of the first non-volatile memory device 1510 in operation 716.

In other words, the first non-volatile memory device 1510 in accordance with an embodiment of the present invention may prevent an excessive increase in the number of the first program pulse PGM_PUL1 used in the program operation on a selected word line included in the first non-volatile memory device 1510 through an operation to set a factor of "the first maximum expected application number PMX_EXP1".

The second non-volatile memory device 1520 may perform a program operation on each of second pages P20, P21, P22, P23, P24, P25, . . . (hereinafter, referred to as 'P20 to P25') in response to a second program command W_CMD2 and a second input data W_DATA2 applied from the controller 130.

The second operation control block 730 of the second non-volatile memory device 1520 may perform the program operation using a program pulse of an incremental step pulse program (ISPP) method under the control of the controller 130 in operation 732.

In case that it is verified that the second actual application number PRL_USE2 of a second program pulse PGM_PUL2 reaches the second maximum expected application number PMX_EXP2 when the second operation control block 730 of the second non-volatile memory device 1520 performs the program operation using the second program pulse PGM_PUL2 according to the ISPP method, the second operation control block 730 may determine the program operation as failure in operation 733. The second non-volatile memory device 1520 may store an initial value of the second minimum expected application number PLO_EXP2 of the second program pulse PGM_PUL2 according to the ISPP method in a pre-set region thereof in operation 740. The second operation control block 730 of the second non-volatile memory device 1520 may obtain the second maximum expected application number PMX_EXP2 by adding a second predetermined application number PSCOP2 to the second minimum expected application number PLO_EXP2 stored in the pre-set region of the second non-volatile memory device 1520 in operation 736.

In other words, the second non-volatile memory device 1520 in accordance with an embodiment of the present invention may prevent an excessive increase in the number of the second program pulse PGM_PUL2 used in the program operation on a selected word line included in the second non-volatile memory device 1520 through an operation to set a factor of "the second maximum expected application number PMX_EXP2".

Each of the first pages P10 to P15 included in the first non-volatile memory device 1510 may include a plurality of first memory cells (not illustrated), and each of the first memory cells may store N-bit data at one time. N is a natural number equal to or greater than 1. Each of the first memory cells included in the first non-volatile memory device 1510 may have the single level cell (SLC) characteristic in which 1-bit data is stored in each of the memory cell, the multi-level cell (MLC) characteristic in which 2-bit data is stored in each of the memory cells, the triple level cell (TLC) characteristic in which 3-bit data is stored in each of the memory cells or a characteristic in which greater-bit data than 3-bit data is stored in each of the memory cells.

Each of the second pages P20 to P25 included in the second non-volatile memory device 1520 may include a plurality of second memory cells (not illustrated), and each of the second memory cells may store M-bit data at one time.

M is a natural number equal to or greater than 1 and greater than N. For this reason, each of the second memory cells included in the second non-volatile memory device 1520 may have a characteristic that is different from the characteristics of the first memory cells included in the first non-volatile memory device 1510.

For example, when each of the first memory cells included in the first non-volatile memory device 1510 has the single level cell (SLC) characteristic, each of the second memory cells included in the second non-volatile memory device 1520 may have the multi-level cell (MLC) characteristic, the triple level cell (TLC) characteristic, or the characteristic in which the greater-bit data than 3-bit data is stored therein. For another example, when each of the first memory cells included in the first non-volatile memory device 1510 has the multi-level cell (MLC) characteristic, each of the second memory cells included in the second non-volatile memory device 1520 may have the triple level cell (TLC) characteristic or the characteristic in which the greater-bit data than 3-bit data is stored therein.

The first and second non-volatile memory devices 1510 and 1520 having different characteristics may be included in the memory system 110. Accordingly, the first minimum expected application number PLO_EXP1 may be smaller than the second minimum expected application number PLO_EXP2, the first predetermined application number PSCOP1 may be smaller than the second predetermined application number PSCOP2, and the first maximum expected application number PMX_EXP1 may be smaller than the number of the second maximum expectation PMX_EXP2.

Since the first and second non-volatile memory devices 1510 and 1520 having different characteristics may be included in the memory system 110, the controller 130 may completely separate the control of the program operation on the first non-volatile memory device 1510 and the control of the program operation on the second non-volatile memory device 1520.

To be specific, the controller 130 may load the first minimum expected application number PLO_EXP1 from the first non-volatile memory device 1510 and store the loaded first minimum expected application number PLO_EXP1 as the first minimum reference application number PLO_REF1 in the internal memory 144. Further, the controller 130 may load the second maximum expected application number PMX_EXP2 from the second non-volatile memory device 1520 and store the loaded second maximum expected application number PMX_EXP2 as the second minimum reference application number PLO_REF2 in the internal memory 144 in operation 1306.

Even though the program operation is never performed in the first non-volatile memory device 1510 when the first non-volatile memory device 1510 is initially manufactured, an initial value of the first minimum expected application number PLO_EXP1 on the program operation may be determined and stored in the pre-set region of the first non-volatile memory device 1510 through a test during the process of manufacturing the first non-volatile memory device 1510. Even when the first non-volatile memory device 1510 is installed and used, the initial value of the first minimum expected application number PLO_EXP1 may be updated and stored in the pre-set region of the first non-volatile memory device 1510 through an operation of the controller 130, which is to be described below.

Similarly, even though the program operation is never performed in the second non-volatile memory device 1520 when the second non-volatile memory device 1520 is initially manufactured, an initial value of the second minimum expected application number PLO_EXP2 on the program operation may be determined and stored in the pre-set region of the second non-volatile memory device 1520 through a test during the process of manufacturing the second non-volatile memory device 1520. Even when the second non-volatile memory device 1520 is installed and used, the initial value of the second minimum expected application number PLO_EXP2 may be updated and stored in the pre-set region of the second non-volatile memory device 1520 through an operation of the controller 130, which is to be described below.

For example, when the program operation has never been performed in the first non-volatile memory device 1510 while the first non-volatile memory device 1510 has the single level cell (SLC) characteristic in which the 1-bit data is stored in each of the first memory cells thereof, the initial value of the first minimum expected application number PLO_EXP1 may be determined as value 2 and stored in the pre-set region of the first non-volatile memory device 1510 through the test during the process of manufacturing the first non-volatile memory device 1510. When the program operation has never been performed in the second non-volatile memory device 1520 while the second non-volatile memory device 1520 has the triple level cell (TLC) characteristic in which the 3-bit data is stored in each of the second memory cells thereof, the initial value of the second minimum expected application number PLO_EXP2 may be determined as value 21 and stored in the pre-set region of the second non-volatile memory device 1520 through the test during the process of manufacturing the second non-volatile memory device 1520.

In this case, the controller 130 may load and store the first minimum expected application number PLO_EXP1 having a value of 2 stored in the pre-set region of the first non-volatile memory device 1510 as the first minimum reference application number PLO_REF1 having a value of 2 in the internal memory 144. Further, the controller 130 may load and store the second minimum expected application number PLO_EXP2 having a value of 21 stored in the pre-set region of the second non-volatile memory device 1520 as the second minimum reference application number PLO_REF2 having a value of 21 in the internal memory 144.

Subsequently, when the program operation is performed in the first non-volatile memory device 1510, the initial value of the first minimum expected application number PLO_EXP1 may be updated and determined as value 3 and stored in the pre-set region of the first non-volatile memory device 1510 through an operation of the controller 130, which is to be described below. In this case, the controller 130 may load and store the first minimum expected application number PLO_EXP1 having a value of 3 stored in the pre-set region of the first non-volatile memory device 1510 as the first minimum reference application number PLO_REF1 having a value of 3 in the internal memory 144. Similarly, when the program operation is performed in the second non-volatile memory device 1520, the initial value of the second minimum expected application number PLO_EXP2 may be updated and determined as value 24 and stored in the pre-set region of the second non-volatile memory device 1520 through an operation of the controller 130, which is to be described below. In this case, the controller 130 may load and store the second minimum expected application number PLO_EXP2 having a value of 24 stored in the pre-set region of the second non-volatile memory device 1520 as the second minimum reference application number PLO_REF2 having a value of 24 in the internal memory 144.

The first minimum expected application number PLO_EXP1 loaded from the pre-set region of the first non-volatile memory device 1510 and the second minimum expected application number PLO_EXP2 loaded from the pre-set region of the second non-volatile memory device 1520 may be stored as the first minimum expected application number PLO_EXP1 and the second minimum expected application number PLO_EXP2 simultaneously with the first minimum reference application number PLO_REF1 and the second minimum reference application number PLO_REF2 in the internal memory 144 of the controller 130. In other words, as illustrated in the drawing, the first minimum expected application number PLO_EXP1, the first minimum reference application number PLO_REF1, the second minimum expected application number PLO_EXP2 and the second minimum reference application number PLO_REF2 may be simultaneously stored in the internal memory 144 of the controller 130. In another embodiment different from what is shown in the drawings, the controller 130 may store the first minimum expected application number PLO_EXP1 loaded from the pre-set region of the first non-volatile memory device 1510 and the second minimum expected application number PLO_EXP2 loaded from the pre-set region of the second non-volatile memory device 1520 just as the first minimum reference application number PLO_REF1 and the second minimum reference application number PLO_REF2, respectively, in the internal memory 144.

The initial operation may mean an operation to supply power to the memory system 110. It may be possible to determine a predetermined operation performed according to the decision of the system designer as the initial operation. The internal memory 144 included in the controller 130 may be the same constituent element as the memory 144 described with reference to FIG. 1.

In operation 1307, the controller 130 may check the first actual application number PRL_USE1 and control the first minimum reference application number PLO_REF1 based on a result of the check whenever the program operation is completed in the first non-volatile memory device 1510 after the initial operation. In other words, when the first actual application number PRL_USE1 of the first program pulse PGM_PUL1 used during the program operation is greater than the first minimum reference application number PLO_REF1, as the result of the check, the controller 130 may increase the first minimum reference application number PLO_REF1 up to the first actual application number PRL_USE1 of the first program pulse PGM_PUL1 used during the program operation, in operation 1308.

To be specific, after the initial operation, the controller 130 may request a program operation on the first non-volatile memory device 1510, and thus the first non-volatile memory device 1510 may complete the performance of the program operation using a plurality of first program pulses PGM_PUL1 according to the ISPP method. The number of the first program pulses PGM_PUL1 that are used until the first non-volatile memory device 1510 completes the performance of the program operation may be the first actual application number PRL_USE1. When the program operation requested by the controller 130 is performed in the first non-volatile memory device 1510, a result of the program operation together with the first actual application number PRL_USE1 may have to be transmitted to the controller 130 whether the program operation is successive or failed.

In operation 1311, the controller 130 may compare the first minimum reference application number PLO_REF1 of the internal memory 144 with the first minimum expected application number PLO_EXP1 of the first non-volatile memory device 1510 for each first predetermined moment and may update the first minimum expected application number PLO_EXP1 based on a result of the comparison. In other words, when the first minimum expected application number PLO_EXP1 of the first non-volatile memory device 1510 is smaller than the first minimum reference application number PLO_REF1 of the internal memory 144 as the result of the comparison, the controller 130 may increase the first minimum expected application number PLO_EXP1 of the first non-volatile memory device 1510 up to the first minimum reference application number PLO_REF1 of the internal memory 144 in operation 1312 and may update the increased first minimum expected application number PLO_EXP1 to the first non-volatile memory device 1510 in operation 714.

As illustrated in the drawing, when the controller 130 loads and stores the first minimum expected application number PLO_EXP1 as the first minimum reference application number PLO_REF1 and the first minimum expected application number PLO_EXP1 in the internal memory 144 during the initial operation, the controller 130 may compare a value of the first minimum reference application number PLO_REF1 and a value of the first minimum expected application number PLO_EXP1 of the internal memory 144 for the each first predetermined moment. However, differently from what is shown in the drawing, when the controller 130 loads and stores the first minimum expected application number PLO_EXP1 of the first non-volatile memory device 1510 just as the first minimum reference application number PLO_REF1 in the internal memory 144, the controller 130 may compare the value of the first minimum expected application number PLO_EXP1 loaded from the first non-volatile memory device 1510 with the value of the first minimum reference application number PLO_REF1 of the internal memory 144 for the each first predetermined moment.

In operation 1309, the controller 130 may check the second actual application number PRL_USE2 and control the second minimum reference application number PLO_REF2 based on a result of the check whenever the program operation is completed in the second non-volatile memory device 1520 after the initial operation. In other words, when the second actual application number PRL_USE2 of the second program pulse PGM_PUL2 used during the program operation is greater than the second minimum reference application number PLO_REF2, as the result of the check, the controller 130 may increase the second minimum reference application number PLO_REF2 up to the second actual application number PRL_USE2 of the second program pulse PGM_PUL2 used during the program operation, in operation 1310.

To be specific, after the initial operation, the controller 130 may request a program operation on the second non-volatile memory device 1520, and thus the second non-volatile memory device 1520 may complete the performance of the program operation using a plurality of second program pulses PGM_PUL2 according to the ISPP method. The number of the second program pulses PGM_PUL2 that are used until the second non-volatile memory device 1520 completes the performance of the program operation may be the second actual application number PRL_USE2. When the program operation requested by the controller 130 is performed in the second non-volatile memory device 1520, a result of the program operation together with the second actual application number PRL_USE2 may have to be transmitted to the controller 130 whether the program operation is successive or failed.

In operation 1313, the controller 130 may compare the second minimum reference application number PLO_REF2 of the internal memory 144 with the second minimum expected application number PLO_EXP2 of the second non-volatile memory device 1520 for each second predetermined moment and may update the second minimum expected application number PLO_EXP2 based on a result of the comparison. In other words, when the second minimum expected application number PLO_EXP2 of the second non-volatile memory device 1520 is smaller than the second minimum reference application number PLO_REF2 of the internal memory 144 as the result of the comparison, the controller 130 may increase the second minimum expected application number PLO_EXP2 of the second non-volatile memory device 1520 up to the second minimum reference application number PLO_REF2 of the internal memory 144 in operation 1314 and may update the increased second minimum expected application number PLO_EXP2 to the second non-volatile memory device 1520 in operation 734.

As illustrated in the drawing, when the controller 130 loads and stores the second minimum expected application number PLO_EXP2 of the second non-volatile memory device 1520 as the second minimum reference application number PLO_REF2 and the second minimum expected application number PLO_EXP2 in the internal memory 144 during the initial operation, the controller 130 may compare a value of the second minimum reference application number PLO_REF2 and a value of the second minimum expected application number PLO_EXP2 of the internal memory 144 for the each second predetermined moment. However, in an embodiment different from what is shown in the drawing, when the controller 130 loads and stores the second minimum expected application number PLO_EXP2 of the second non-volatile memory device 1520 just as the second minimum reference application number PLO_REF2 in the internal memory 144, the controller 130 may compare the value of the second minimum expected application number PLO_EXP2 loaded from the second non-volatile memory device 1520 with the value of the second minimum reference application number PLO_REF2 of the internal memory 144 for the each second predetermined moment.

The first predetermined moment may be repeated whenever the number of times that the program operation is completed in the first non-volatile memory device 1510 reaches a first predetermined application number. In other words, the first predetermined moment may be a moment when the number of times that the controller 130 requests the program operation of the first non-volatile memory device 1510 reaches the first predetermined application number.

The second predetermined moment may be repeated whenever the number of times that the program operation is completed in the second non-volatile memory device 1520 reaches a second predetermined application number. In other words, the second predetermined moment may be a moment when the number of times that the controller 130 requests the program operation of the second non-volatile memory device 1520 reaches the second predetermined application number.

Since the number of bits stored at one time in each of the first memory cells included in the first non-volatile memory device 1510 is smaller than the number of bits stored at one time in each of the second memory cells included in the second non-volatile memory device 1520, durability of the second memory cells may become weak relative to durability of the first memory cells due to a single program operation. Therefore, the first predetermined application number for determining the first predetermined moment may be greater than the second predetermined application number for determining the second predetermined moment. A difference between the first predetermined application number and the second predetermined application number may be varied according to the decision of a system designer.

For example, the first predetermined moment may be a moment when the first predetermined application number that the controller 130 requests the program operation of the first non-volatile memory device 1510 is a multiple of 100, i.e., 100, 200, 300 and the like. The second predetermined moment may be a moment when the second predetermined application number that the controller 130 requests the program operation of the second non-volatile memory device 1520 is a multiple of 50, i.e., 50, 100, 150 and the like.

As described above, through the operations of the controller 130 performed after the initial operation, the first minimum expected application number PLO_EXP1 stored in the pre-set region of the first non-volatile memory device 1510 may be controlled, which means that the first maximum expected application number PMX_EXP1 may be also controlled. In addition, through the operations of the controller 130 performed after the initial operation, the second minimum expected application number PLO_EXP2 stored in the pre-set region of the second non-volatile memory device 1520 may be controlled, which means that the second maximum expected application number PMX_EXP2 may be also controlled. The first minimum expected application number PLO_EXP1 and the second minimum expected application number PLO_EXP2 may be controlled independently of each other. Accordingly, the memory system 110 in accordance with an embodiment of the present invention may limit the number of first program pulse PGM_PUL1 used during the program operation on the selected word line based on the first maximum expected application number PMX_EXP1 of relatively small size in a relatively initial period after the first non-volatile memory device 1510 is manufactured and limit the number of first program pulse PGM_PUL1 used during the program operation on the selected word line based on the first maximum expected application number PMX_EXP1 of relatively large size in a latter period after the first non-volatile memory device 1510 is manufactured. Besides, the memory system 110 in accordance with an embodiment of the present invention may limit the number of second program pulse PGM_PUL2 used during the program operation on the selected word line based on the second maximum expected application number PMX_EXP2 of relatively small size in a relatively initial period after the second non-volatile memory device 1520 is manufactured and limit the number of second program pulse PGM_PUL2 used during the program operation on the selected word line based on the second maximum expected application number PMX_EXP2 of relatively large size in a latter period after the second non-volatile memory device 1520 is manufactured. The memory system 110 may completely separate the operation to control the first maximum expected application number PMX_EXP1 of the first non-volatile memory device 1510 and the operation to control the second maximum expectation PMX_EXP2 of the second non-volatile memory device 1520.

In accordance with an embodiment of the present invention, it is possible to calculate and adjust the minimum and maximum number of program pulses used in the nonvolatile memory device 150 in which the program operation is performed by using the program pulse of the Incremental Step Pulse Programming ISPP method in real time. Thereby, it is possible to prevent excessive usage of the program pulse.

FIGS. 9 to 17 are diagrams schematically illustrating application examples of the data processing system of FIGS. 1 to 8 according to various embodiments.

Figure 9:
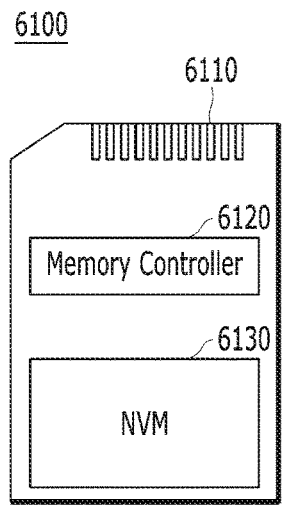
FIGS. 9 to 17 are diagrams schematically illustrating application examples of a data processing system, in accordance with various embodiments of the present invention.

FIG. 9 is a diagram schematically illustrating an example of the data processing system including the memory system in accordance with an embodiment. FIG. 9 schematically illustrates a memory card system to which the memory system in accordance with an embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 8, and the memory device 6130 may correspond to the memory device 150 of the memory system 110 described with reference to FIGS. 1 to 8.

Thus, the memory controller 6120 may include a RAM, a processing unit, a host interface, a memory interface and an error correction unit. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
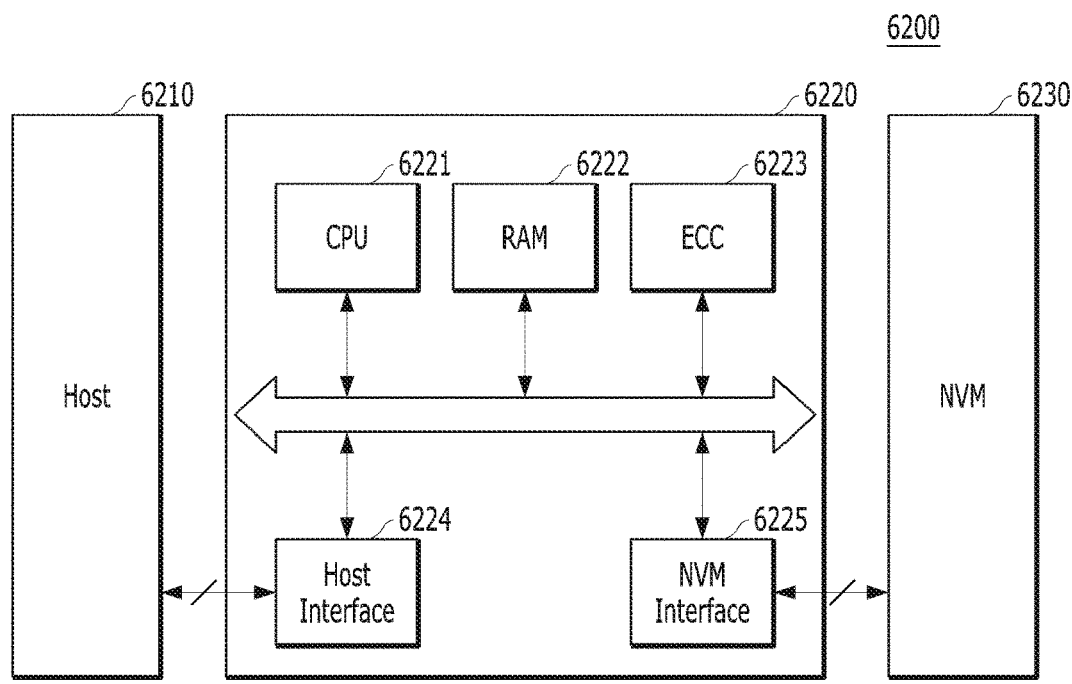

FIG. 10 is a diagram schematically illustrating another example of the data processing system including a memory system, in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 8, and the memory controller 6220 may correspond to the controller 130 in the memory system 110 described in FIGS. 1 to 8.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe, or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 11:
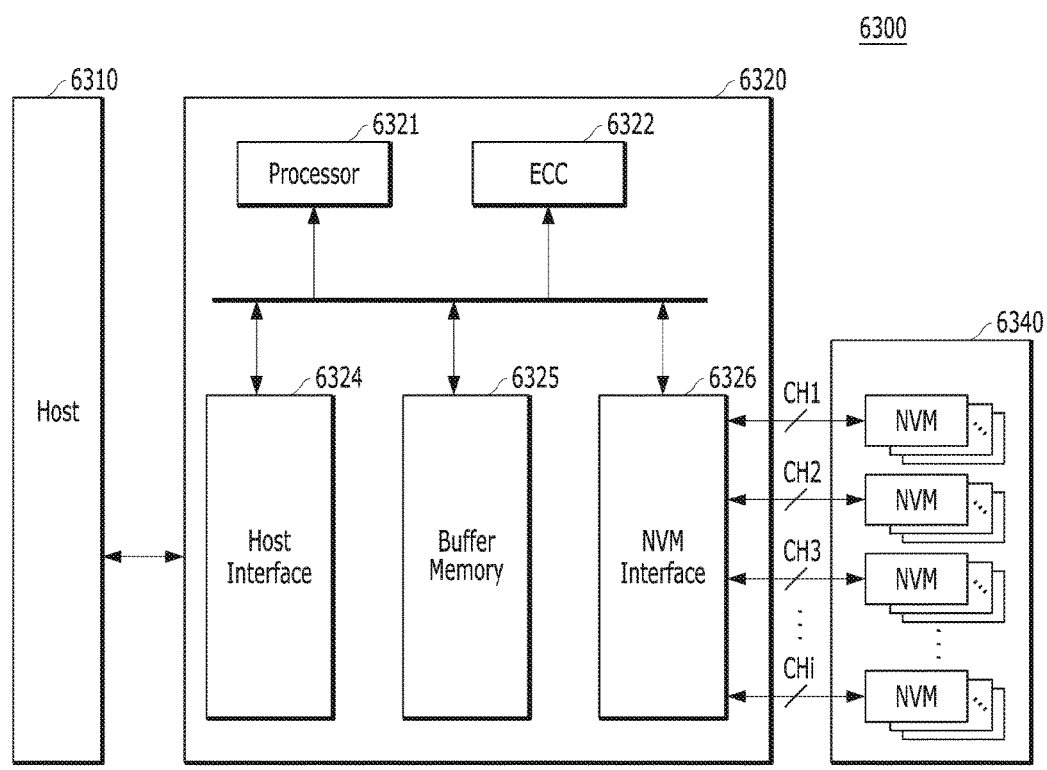

FIG. 11 is a diagram schematically illustrating another example of the data processing system including the memory system in accordance with an embodiment. FIG. 11 schematically illustrates an SSD to which the memory system in accordance with an embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
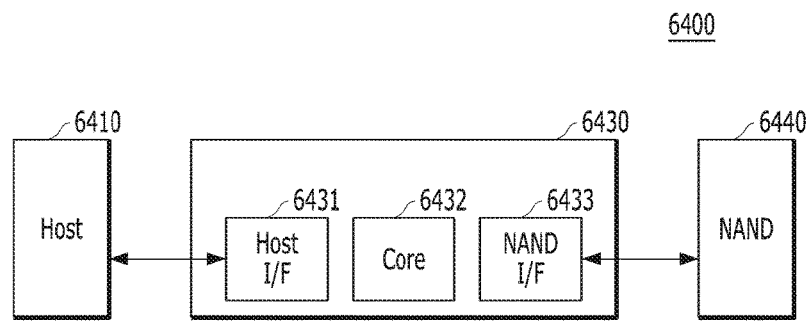

FIG. 12 is a diagram schematically illustrating another example of the data processing system including the memory system in accordance with an embodiment. FIG. 12 schematically illustrates an embedded Multi-Media Card (eMMC) to which the memory system in accordance with an embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with an embodiment. FIGS. 13 to 16 schematically illustrate UFS (Universal Flash Storage) systems to which the memory system in accordance with an embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
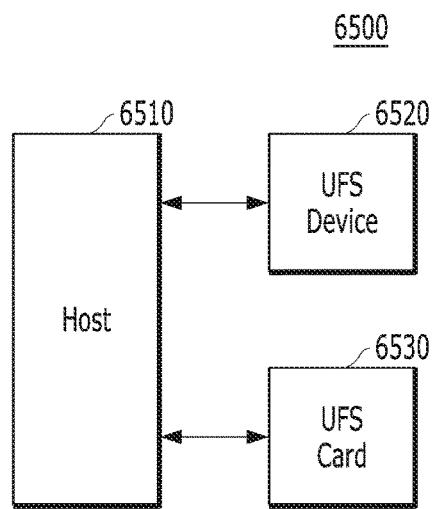

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
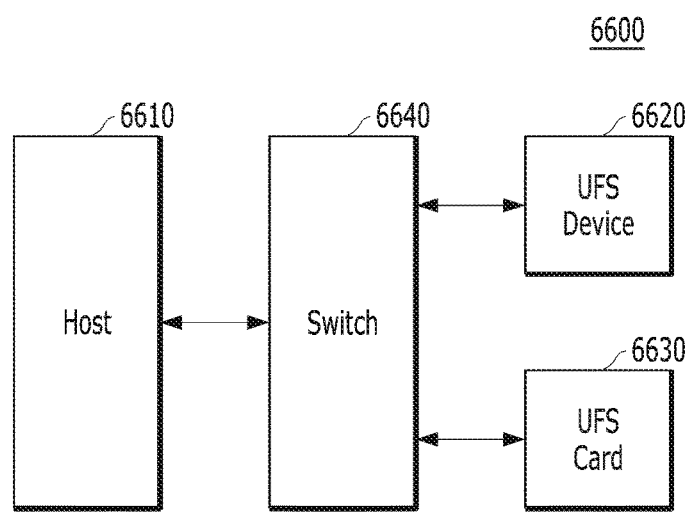

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
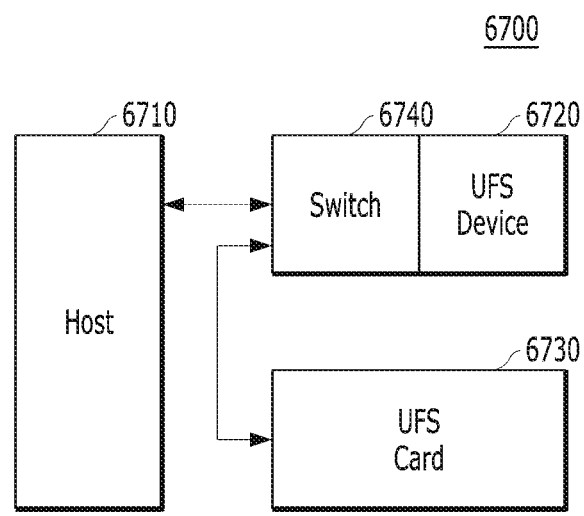

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
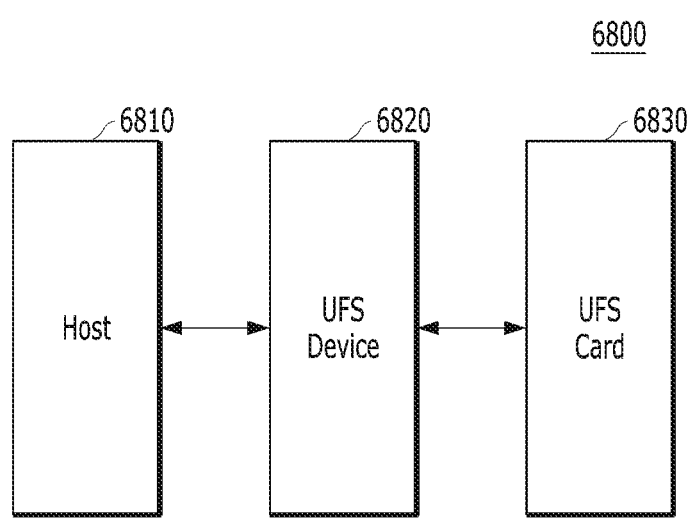

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
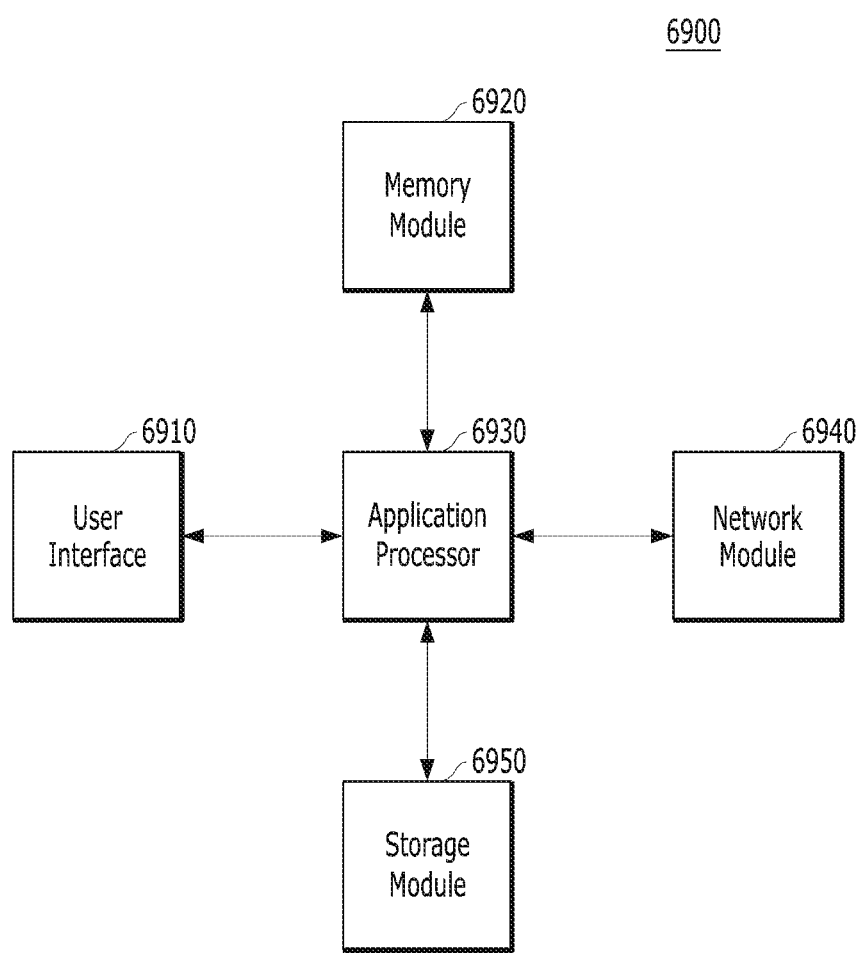

FIG. 17 is a diagram schematically illustrating another example of the data processing system including the memory system in accordance with an embodiment. FIG. 17 is a diagram schematically illustrating a user system to which the memory system in accordance with an embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as determined in the following claims.

What is claimed is:

1. A memory system comprising:
a non-volatile memory device in which a plurality of pages are included and a minimum expected application number A of a program pulse is stored, wherein a program operation is performed on the pages using the program pulse according to an incremental step pulse program (ISPP) method; and
a controller suitable for loading the minimum expected application number A from the non-volatile memory device and storing the minimum expected application number A as a minimum reference application number B in an internal memory during an initial operation, for checking an actual application number C, which is the number of the program pulse used whenever the program operation is completed in the non-volatile memory device, after the initial operation and controlling the minimum reference application number B according to a result of the check, and for comparing the minimum reference application number B with the minimum expected application number A for each predetermined moment and updating the minimum expected application number A to the non-volatile memory device according to a result of the comparison.

2. The memory system of claim 1, wherein the controller increases the minimum reference application number B up to the actual application number C when the actual application number C is greater than the minimum reference application number B as the result of checking the actual application number C whenever the program operation is completed in the non-volatile memory device after the initial operation.

3. The memory system of claim 2, wherein the controller increases the minimum expected application number A up to the minimum reference application number B and updates the increased minimum expected application number A to the non-volatile memory device when the minimum expected application number A is smaller than the minimum reference application number B as the result of comparing the minimum expected application number A with the minimum reference application number B at the predetermined moment.

4. The memory system of claim 3, wherein the predetermined moment repeats whenever the number of times that the program operation is completed in the non-volatile memory device reaches a specific number of times F.

5. The memory system of claim 2, wherein when the number of use of the program pulse reaches a maximum expected application number D when the program operation is performed according to a request from the controller, the non-volatile memory device determines the program operation as failure, and the maximum expected application number D has a value obtained by adding a predetermined application number E to the minimum expected application number A.

6. A memory system, comprising:
a first non-volatile memory device in which a plurality of first pages are included and a first minimum expected application number A1 of a program pulse is stored, wherein a program operation is performed on the first pages using the program pulse according to an incremental step pulse program (ISPP) method;
a second non-volatile memory device in which a plurality of second pages are included and a second minimum expected application number A2 of a program pulse is stored, wherein a program operation is performed on the second pages using the program pulse according to the incremental step pulse program (ISPP) method; and
a controller suitable for loading the first minimum expected application number A1 and the second minimum expected application number A2 respectively from the first and second non-volatile memory devices and storing the first minimum expected application number A1 and the second minimum expected application number A2 as a first minimum reference application number B1 and a second minimum reference application number B2 respectively in an internal memory during an initial operation, for checking a first actual application number C1 and a second actual application number C2, which are the number of the program pulse used whenever the program operation is completed in each of the first and second non-volatile memory device, after the initial operation and controlling the first minimum reference application number B1 and the second minimum reference application number B2 according to a result of the check, and for comparing the first minimum reference application number B1 and the second minimum reference application number B2 respectively with the first minimum expected application number A1 and the second minimum expected application number A2 for each of first and second predetermined moments and updating the first minimum expected application number A1 and the second minimum expected application number A2 to the first and second non-volatile memory devices according to a result of the comparison.

7. The memory system of claim 6, wherein the controller increases the first minimum reference application number B1 up to the first actual application number C1 when the first actual application number C1 is greater than the first minimum reference application number B1 as the result of checking the first actual application number C1 whenever the program operation is completed in the first non-volatile memory device after the initial operation.

8. The memory system of claim 7, wherein the controller increases the first minimum expected application number A1 up to the first minimum reference application number B1 and updates the increased first minimum expected application number A1 to the first non-volatile memory device when the first minimum expected application number A1 is smaller than the first minimum reference application number B1 as the result of comparing the first minimum expected application number A1 with the first minimum reference application number B1 at the first predetermined moment.

9. The memory system of claim 7, wherein the controller increases the second minimum reference application number B2 up to the second actual application number C2 when the second actual application number C2 is greater than the second minimum reference application number B2 as the result of checking the second actual application number C2 whenever the program operation is completed in the second non-volatile memory device after the initial operation.

10. The memory system of claim 9, wherein the controller increases the second minimum expected application number A2 up to the second minimum reference application number B2 and updates the increased second minimum expected application number A2 to the second non-volatile memory device when the second minimum expected application number A2 is smaller than the second minimum reference application number B2 as the result of comparing the second minimum expected application number A2 with the second minimum reference application number B2 at the second predetermined moment.

11. The memory system of claim 9, wherein each of the first pages includes a plurality of first memory cells, and each of the first memory cells stores N-bit data at a time, and when the number of use of the program pulse reaches a first maximum expected application number D1 when the program operation is performed according to a request from the controller, the first non-volatile memory device determines the program operation as failure, and the first maximum expected application number D1 has a value obtained by adding a first predetermined application number E1 to the first minimum expected application number A1.

12. The memory system of claim 11, wherein each of the second pages includes a plurality of second memory cells, and each of the second memory cells stores M-bit data at a time, and when the number of use of the program pulse reaches a second maximum expected application number D2 when the program operation is performed according to a request from the controller, the second non-volatile memory device determines the program operation as failure, and the second maximum expected application number D2 has a value obtained by adding a second predetermined application number E2 to the second minimum expected application number A2, and the first minimum expected application number A1 is smaller than the second minimum expected application number A2, and the first predetermined application number E1 is smaller than the second predetermined application number E2, and M is a natural number greater than N.

13. The memory system of claim 12, wherein the first predetermined moment repeats whenever the number of times that the program operation is completed in the first non-volatile memory device reaches a first specific number of times F1.

14. The memory system of claim 13, wherein the second predetermined moment repeats whenever the number of times that the program operation is completed in the second non-volatile memory device reaches a second specific number of times F2, and the first specific number of times F1 is greater than the second specific number of times F2.

15. An operating method of a memory system including a non-volatile memory device that includes a plurality of pages on which a program operation is performed using a program pulse according to an incremental step pulse program (ISPP) method and a minimum expected application number A of the program pulse, comprising:

loading the minimum expected application number A from the non-volatile memory device and storing the minimum expected application number A as a minimum reference application number B in an internal memory during an initial operation;

checking an actual application number C, which is the number of the program pulse used whenever the program operation is completed in the non-volatile memory device, after the initial operation and controlling the minimum reference application number B according to a result of the check; and comparing the minimum reference application number B with the minimum expected application number A for each predetermined moment and updating the minimum expected application number A to the non-volatile memory device according to a result of the comparison.

16. The operating method of claim 15, wherein the controlling of the minimum reference application number B is carried out to increase the minimum reference application number B up to the actual application number C when the actual application number C is greater than the minimum reference application number B as the result of checking the actual application number C whenever the program operation is completed in the non-volatile memory device after the initial operation.

17. The operating method of claim 16, wherein the updating of the minimum expected application number A to the non-volatile memory device is carried out to increase the minimum expected application number A up to the minimum reference application number B and update the increased minimum expected application number A
to the non-volatile memory device when the minimum expected application number A is smaller than the minimum reference application number B as the result of comparing the minimum expected application number A with the minimum reference application number B at the predetermined moment.

18. The operating method of claim 17, wherein the predetermined moment repeats whenever the number of times that the program operation is completed in the nonvolatile memory device reaches a specific number of times.

19. The operating method of claim 16, further comprising:
determining the program operation as failure when the number of use of the program pulse reaches a maximum expected application number D when the program operation is performed in the non-volatile memory device,
wherein the maximum expected application number D has a value obtained by adding a predetermined application number E to the minimum expected application number A.

20. A memory system comprising:
a nonvolatile memory device suitable for performing a program operation to a page according to an incremental step pulse program scheme, and counting an actual application number, which is a number of the program pulse used whenever the program operation is completed; and
a controller suitable for controlling the nonvolatile memory device to perform the program operation, and reflecting the actual application number to a reference application number of the program pulse for the program operation, which is initially stored in the nonvolatile memory device at a manufacturing phase of the memory system,
wherein the nonvolatile memory device determines a failure of the program operation based on a maximum application number of the program pulse for the program operation, which is greater than the reference application number by a predetermined number.

* * * * *